(12) United States Patent
Strandberg

(10) Patent No.: US 9,776,125 B2
(45) Date of Patent: Oct. 3, 2017

(54) MARINE EXHAUST GAS SCRUBBER

(71) Applicant: Marine Global Holding AS, Oslo (NO)

(72) Inventor: Peter Strandberg, Lyngdal (NO)

(73) Assignee: Yara Marine Technologies AS, Oslo (NO)

( * ) Notice: Subject to any disclaimer, the term of this patent is extended or adjusted under 35 U.S.C. 154(b) by 0 days.

(21) Appl. No.: 14/759,802

(22) PCT Filed: Feb. 21, 2014

(86) PCT No.: PCT/EP2014/053428
§ 371 (c)(1),
(2) Date: Jul. 8, 2015

(87) PCT Pub. No.: WO2014/128261
PCT Pub. Date: Aug. 28, 2014

(65) Prior Publication Data
US 2016/0016109 A1    Jan. 21, 2016

Related U.S. Application Data

(60) Provisional application No. 61/768,019, filed on Feb. 22, 2013.

(30) Foreign Application Priority Data

Feb. 22, 2013   (NO) .................................. 20130290

(51) Int. Cl.
*B01D 53/14*   (2006.01)
*B01D 3/26*    (2006.01)
(Continued)

(52) U.S. Cl.
CPC ........... *B01D 53/1481* (2013.01); *B01D 3/26* (2013.01); *B01D 47/06* (2013.01);
(Continued)

(58) Field of Classification Search
None
See application file for complete search history.

(56) References Cited

U.S. PATENT DOCUMENTS 3,708,958 A * 1/1973 Duty .................. B01D 53/1493
                                                         261/111
3,798,883 A * 3/1974 Heeney .................. B05B 1/265
                                                         55/456

(Continued)

FOREIGN PATENT DOCUMENTS

| AU | 546903 B2 | 9/1985 |
| BE | 532199 | 10/1954 |
| WO | WO-2012128721 A2 | 9/2012 |

OTHER PUBLICATIONS

Persichini, Carlo, "International Search Report," prepared for PCT/EP2014/053428, as mailed May 26, 2014, four pages.

*Primary Examiner* — Anita Nassiri Motlagh
(74) *Attorney, Agent, or Firm* — Winstead PC

(57) ABSTRACT

A vertical scrubber (1) for exhaust gas from a marine vessel is described. An exhaust gas tube (2) is substantially coaxially arranged through the bottom of a lower scrubbing chamber (3) and is released though an exhaust gas outlet (20) being coaxially arranged through the top of an upper scrubbing chamber (13). A lower scrubbing chamber deflection body (4) is arranged above the opening of the exhaust gas tube (2) for redirecting the exhaust gas towards the walls of the scrubber and create turbulent gas flow, where one or more lower chamber water injector(s) (6, 6') is (are) arranged above the lower scrubbing chamber deflection body (4), to introduce scrubbing water, and where a lower chamber exhaust gas outlet (12) is arranged at the top of the lower scrubbing chamber (3) as a coaxial constriction, for (Continued)

withdrawing the partly scrubbed exhaust gas from the first scrubbing chamber and introducing the gas into the upper scrubbing chamber (13).

9 Claims, 2 Drawing Sheets

(51) Int. Cl.
    *B01D 47/06*    (2006.01)
    *B01D 53/18*    (2006.01)
    *F23J 15/04*    (2006.01)
    *F01N 3/04*    (2006.01)
    *F01N 13/00*    (2010.01)
    *B01D 53/50*    (2006.01)
    *B01D 53/60*    (2006.01)
    *B01D 53/78*    (2006.01)
    *B01D 45/06*    (2006.01)

(52) U.S. Cl.
CPC ..... *B01D 53/1406* (2013.01); *B01D 53/1493* (2013.01); *B01D 53/18* (2013.01); *B01D 53/185* (2013.01); *F01N 3/04* (2013.01); *F01N 3/043* (2013.01); *F01N 13/004* (2013.01); *F23J 15/04* (2013.01); *B01D 45/06* (2013.01); *B01D 53/501* (2013.01); *B01D 53/60* (2013.01); *B01D 53/78* (2013.01); *B01D 2221/08* (2013.01); *B01D 2251/402* (2013.01); *B01D 2252/1035* (2013.01); *B01D 2252/60* (2013.01); *B01D 2257/302* (2013.01); *B01D 2257/404* (2013.01); *F23J 2215/20* (2013.01); *F23J 2219/40* (2013.01); *Y02T 10/20* (2013.01)

(56) References Cited

U.S. PATENT DOCUMENTS

| | | | | |
|---|---|---|---|---|
| 4,411,846 A | * | 10/1983 | Ulrich | ............... B01D 53/18 261/116 |
| 2008/0044335 A1 | | 2/2008 | Anttila et al. | |
| 2010/0116140 A1 | * | 5/2010 | Arai | ...................... B01D 47/06 96/252 |

* cited by examiner

MARINE EXHAUST GAS SCRUBBER

TECHNICAL FIELD

The present invention relates to an improved method and plant for marine exhaust gas cleaning. More specific the invention relates to a method and plant using wet scrubbing of marine exhaust gas for reducing the content of environmental pollutants in the exhaust gas.

BACKGROUND ART

Traditionally, it has been allowed release exhaust gas from marine vessels into the atmosphere with little or no post combustion treatment to reduce the emission of environmental deleterious constituents. International Maritime Organization (IMO) and several governments have implemented regulations that will prevent vessels not fulfilling minimum requirements for emission from operating. These legislations have forced ship owners to look for solutions for fulfilling the requirements, not only for ships to be built but more importantly for the current fleet of vessels.

Of special interest is emission of sulphur oxides (SOx) and particles formed by the combustion and emitted into the atmosphere in the exhaust gas. Marine vessels typically uses lean burn combustion engines and lower grade fuels that both results in high levels of SOx and particles in the exhaust gas. SOx is a result of combustion of sulphur containing compounds that are especially abundant in low-grade fuels.

The content of SOx may be reduced by one or more of a plurality of well-known technologies, or by using higher-grade fuels. Higher-grade fuels are, however, far more expensive than normal low-grade fuels.

Seawater scrubbers or more generally wet gas scrubbers are known for reduction of SOx and particles. To obtain a sufficient reduction of SOx and particles to meet international and national requirements, packed bed scrubbers are suggested/marketed by most of the suppliers of such equipment. Wet scrubbers without packing for increasing the contact area between gas and liquid have so far not been found to be as efficient packed bed scrubbers.

Common for the known processes that are efficient in removing SOx and particles with a sufficient efficiency to obtain a treated exhaust gas fulfilling the requirements, is that the equipment needed is heavy and space consuming in addition to reducing the efficiency of the engine output substantially and thereby increasing the running cost of the vessel.

Space and weight is always a problem in a marine vessel, as space consuming and heavy equipment will take up valuable space onboard and displace paying guests.

Due to the size of the existing solutions for wet scrubbing for reduction of SOx and particles to acceptable levels, the installation of the equipment will require substantial reconstruction of parts of the interior of the vessel, and may require the vessel to be taken out of service for a substantial period.

For state of the art packed bed scrubbers, as mentioned above, a bypass for exhaust has to be provided if water flow is stopped, as packed bed scrubbers should not be run dry.

Accordingly, the known solutions are not optimal for new projects and are very expensive to install in an existing vessel.

An object of the present invention is to provide a solution that is a good option for new projects due to the advantages given, and that is easy to install on an existing vessel where it is not required to take the vessel out of service for a long period, if at all.

SUMMARY OF INVENTION

According to a first aspect the present invention relates to a scrubber for exhaust gas from a marine vessel, comprising a lower and an upper scrubbing chamber, the scrubbing chambers being substantially symmetric about a common length axis being substantially vertically arranged, wherein an exhaust gas tube (2) is substantially coaxially arranged through the bottom of the lower scrubbing chamber, the exhaust gas tube opening into the lower scrubbing chamber, and an exhaust gas outlet is coaxially arranged through the top of the upper scrubbing chamber, where a lower scrubbing chamber deflection body is arranged above the opening of the exhaust gas tube for redirecting the exhaust gas towards the walls of the scrubber and create turbulent gas flow, where one or more lower chamber water injector(s) is (are) arranged above the lower scrubbing chamber deflection body, to introduce scrubbing water into the exhaust gas stream, and where a lower chamber exhaust gas outlet is arranged at the top of the lower scrubbing chamber as a coaxial constriction, for withdrawing the partly scrubbed exhaust gas from the first scrubbing chamber and introducing the gas into the upper scrubbing chamber.

Introduction of the exhaust gas into scrubbing chambers that are substantially symmetric about a length axis thereof, through a substantially coaxially arranged exhaust gas tube, allows for easy construction and makes it relatively easy to obtain even distribution of the exhaust gas flow in the scrubbing chambers. The deflection body arranged above the exhaust gas inlet ascertains that a turbulent flow is created for intimate mixing of the exhaust gas and water spray for efficient cooling and scrubbing of the exhaust gas to a temperature that allows SOx to be efficiently dissolved by the scrubbing liquid. Scrubbing water drops/droplets introduced through the water injectors both wash and cool the incoming exhaust gas. The second scrubbing chamber is provided to further scrub the exhaust gas for further removal of NOx and particles from the exhaust gas.

According to one embodiment, one or more lower chamber water outlet(s) is (are) arranged to withdraw scrubbing water collected at the bottom part of the lower scrubbing chamber.

According to one embodiment, the lower chamber water injector(s) is (are) arranged substantially along the length axis of the lower scrubbing chamber.

According to one embodiment, two or more water injectors are arranged in the lower scrubbing chamber and where at least one of the water injectors is (are) directed upwards, towards the lower chamber exhaust gas outlet. Injected water influences the gas flow in the scrubber. By directing at least a part of the injected water in the main direction of the gas flow, i.e. upwards, the injected water assists in driving the exhaust gas upwards, and thus reduces the pressure drop in the scrubber compared to a situation where all water is injected downwards.

According to one embodiment, two or more water injectors are arranged in the lower scrubbing chamber and where at least one of the water injectors is (are) directed downwards, towards the lower scrubbing chamber deflection body. Downwards directed water injector(s) assist(s) in an even distribution of scrubbing water in the scrubber.

A ring shaped lower chamber wall deflector is optionally arranged in the wall of the scrubber. The lower chamber wall deflector cooperates with the deflection body in directing the upwards directed flow of exhaust gas towards the length axis of the scrubber, and to create the turbulent flow that is optimal for mixing of scrubbing water/scrubbing liquid and the exhaust gas.

The lower scrubbing chamber deflection body comprises, according to one embodiment, two oppositely directed straight cones having a common base and a common axis of rotation coinciding with the length axis of the scrubber.

One or more water mist nozzle(s) is (are) optionally arranged in the lower scrubbing chamber below the lower scrubbing chamber deflection body. The incoming exhaust gas has to be cooled before efficient absorption of SOx. The scrubbing water raining/falling down from the water injectors, and where a part of the water is reflected by the top of the deflection body and directed towards the walls of the scrubber, may be sufficient for cooling. Introduction of water mist below the deflection body will add to the humidifying and cooling resulting from the contact with the scrubbing water introduced from the water injectors.

An upper scrubbing chamber deflection body is, according to one embodiment, arranged inside the upper scrubbing chamber and above the lower scrubbing chamber exhaust gas outlet. The upper chamber deflection body has substantially the same effect as the above described lower chamber deflection body, in that it redirects the gas flow to cause optimal scrubbing conditions and mixing of exhaust gas and scrubbing liquid in the upper scrubbing chamber. Additionally, the upper scrubbing chamber deflection body also prevents/reduces the flow of scrubbing liquid from the upper scrubbing chamber into the lower scrubbing chamber.

One or more upper scrubbing chamber water injector(s) is (are) preferably arranged in the upper scrubbing chamber. The upper scrubbing chamber water injector(s) ascertains efficient scrubbing in the upper scrubbing chamber.

According to one embodiment, a demister is arranged at the top of the upper scrubbing chamber for reduction of water mist in the scrubbed exhaust gas.

According to a second aspect, the present invention relates to a method for scrubbing of exhaust gas, where the exhaust gas is introduced into a scrubber where the exhaust gas is scrubbed in contact with sea water for reduction of SOx and particles in the exhaust gas, the method comprising the steps of:
  a) Introducing the exhaust gas to be scrubbed through a coaxially arranged exhaust gas tube into a lower scrubbing chamber in a tubular scrubber comprising two or more serially connected scrubbing chambers,
  b) Redirecting the exhaust gas stream by means of a deflection body to create turbulent gas flow;
  c) Introduction of water droplets into the exhaust gas for scrubbing thereof,
  d) Withdrawal of the scrubbed exhaust gas from the first scrubbing chamber and introduction thereof into a second scrubbing chamber wherein the exhaust gas is further scrubbed,
  e) Releasing the scrubbed exhaust gas into the surroundings.

According to one embodiment, water mist is introduced into the incoming exhaust gas for cooling and humidifying thereof between step a) and b).

According to one embodiment, the used scrubbing water withdrawn from the scrubber is released into the surrounding sea. Releasing the used scrubbing water into the sea allows reduces or avoids the need for any further treatment of the scrubbing water and for storing the scrubbing water or deposits therefrom onboard the vessel.

Particles are optionally removed from the used scrubbing water before the water is released. Removing particles reduces the environmental aspects of releasing the scrubbing water into the sea.

According to an alternative embodiment, the used scrubbing water is recycled into the scrubber. Recycling may be required in areas where it is prohibited to release scrubbing water from exhaust gas scrubbers.

When operated in a recycling mode for the scrubbing liquid, the used scrubbing water may be treated to reduce the amount of particles before being recycled into the scrubber. Treatment to reduce the particles in the scrubbing liquid to be recycled will allow for more efficient scrubbing when scrubbing liquid is recycled.

Alkali may be added to the water before recycling thereof into the scrubber. Addition of alkali, such as an aqueous solution of MgO or $Mg(OH)_2$ increases the capacity of the scrubbing liquid to absorb SOx. Such increase in capacity is especially important when recycling the scrubbing liquid as the absorption of SOx will reduce the pH of the scrubbing liquid and thus reduce the capacity to absorb an acidic gas as SOx.

The expressions "scrubbing water" and "scrubbing liquid" as used in the present application both for the liquid used for scrubbing in the scrubber. The scrubbing water or scrubbing liquid is an aqueous liquid such as sea water, sea water with added alkali, or fresh water with added alkali.

DETAILED DESCRIPTION OF THE INVENTION

Figure 1:
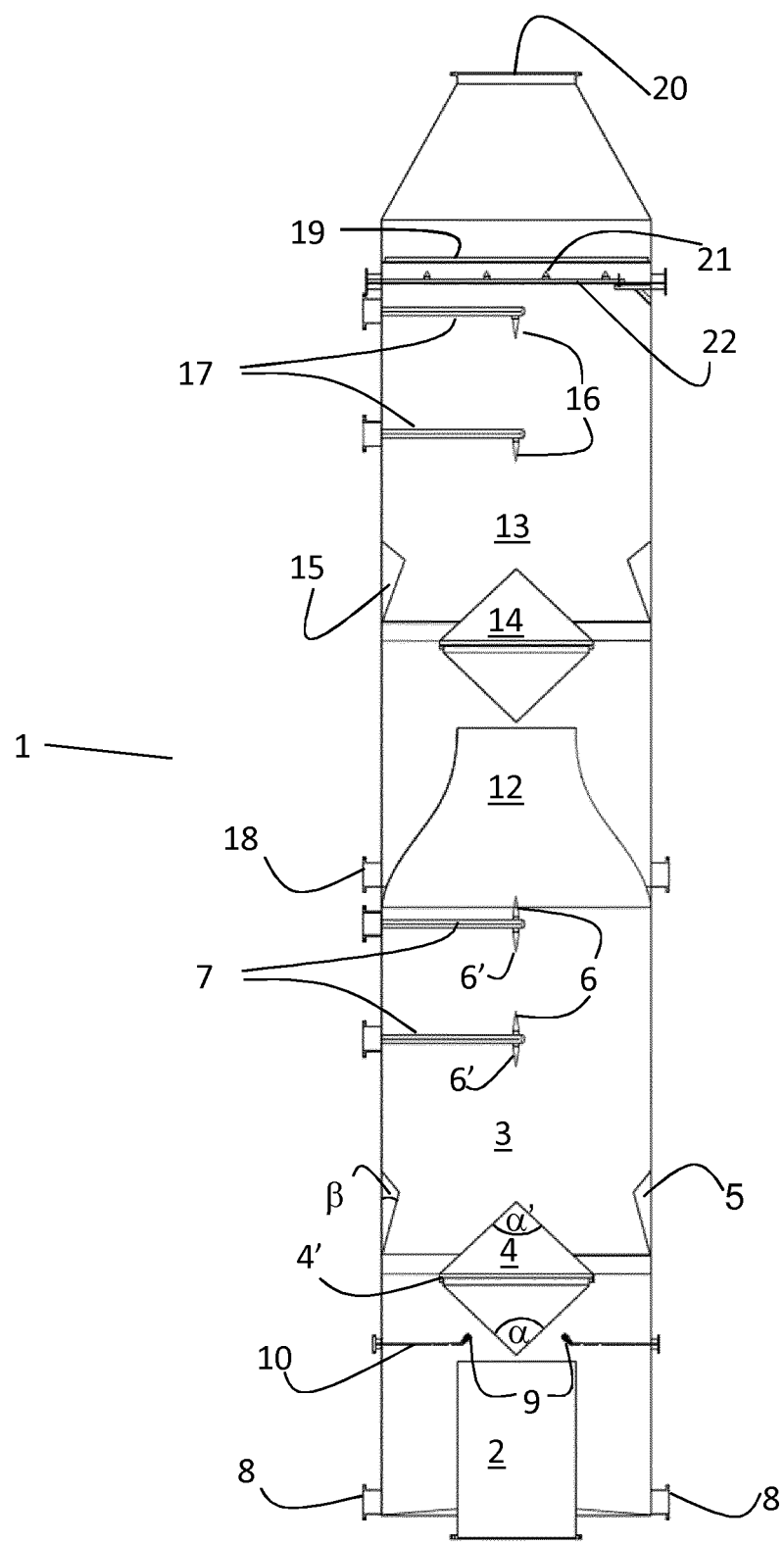
FIG. 1 is a length section through a scrubber according to the present invention.

FIG. 1 illustrates a two-stage scrubber 1 according to the present invention. Exhaust gas from an engine is introduced via an exhaust tube 2 into a lower scrubbing chamber 3 of a scrubber 1. The cross section, or flow area, of the scrubber is preferably substantially larger than the cross section, or flow area, of the exhaust tube, to reduce the gas velocity in the scrubber compared to the exhaust tube, to allow sufficient exhaust gas retention time in the scrubber. A low gas velocity inside the scrubber is also essential to keep the pressure drop over the scrubber as low as possible to avoid losing engine power due to a high counter pressure to the incoming exhaust. The flow area of the scrubber 1 may be from about 1.5 to 20 times the flow area of the exhaust tube, such as e.g. 2 to 10, or 2.5 to 5 times the flow area of the exhaust tube 2. As an example, for an exhaust tube having a diameter of 1.3 m, the diameter of the scrubber may be about 2.4 m, which gives a flow area that is about 4 times the flow are of the exhaust tube.

Both the exhaust tube and the scrubber are preferably tubular elements having substantial circular cross sections, and are arranged to have a common length axis so that the incoming exhaust gas is directed mainly parallel to the common length axis. Accordingly, the exhaust gas pipe has preferably a substantially circular cross section and is substantially coaxially arranged at the bottom part of the present scrubber, as illustrated in FIG. 1. The skilled person will understand that other geometries are possible, and will understand how to alter the below mentioned construction elements if the cross section of the exhaust tube and/or scrubber is/are non-circular.

The present scrubber is preferably arranged so that the length axis is substantially vertical during operation. The exhaust tube is inserted through the bottom of the scrubber, and the cleaned exhaust gas is released through a scrubber outlet 20 at the top of the scrubber. The present scrubber is preferably arranged in a not shown exhaust pipe of the vessel. Typically, two or more the exhaust tubes are arranged in the exhaust pipe. A silencer, being a tubular element of larger diameter than the exhaust tube is arranged in the exhaust pipe to reduce the engine noise, one silencer per exhaust tube. The diameter of the present scrubber is substantially identical to the silencer, whereas the length of the present scrubber may be longer than the silencer, typically about 20 to 40, such as about 30%, longer than the silencer. Even if the scrubber is longer than the silencer, it is in most instances possible to substitute a silencer present in the exhaust pipe of an existing vessel, or to install the present scrubber instead of silencer(s) in a new vessel. The skilled person will, however, understand that a minor reconstruction has to be made to get sufficient space for the scrubber of an existing vessel.

The exemplified scrubber comprises two scrubbing chambers, the lower scrubbing chamber 3 and the upper, or polishing, chamber 13, separated by a lower chamber exhaust gas outlet 12, which is an coaxial constriction defining an outlet from the lower scrubbing chamber 3, and an entry to the upper scrubbing chamber 13. The scrubbing chambers 3, 13 have a similar construction as will be described in further detail below.

A deflection body 4 is arranged close to open end of the exhaust tube 2 to redirect the incoming exhaust gas towards the outer walls of the scrubber. The deflection body 4 comprises in its simplest form two right circular cones pointing in opposite directions from a common circular base. The deflection body is axially arranged so that the length axis of the deflection body, connecting the apexes of the cones lower cone pointing downwards, and the upper cone pointing upwards, coincides with the length axis of the scrubber. The deflection body is fastened to the walls of the scrubber by mean not shown connectors that are formed to cause minimal disturbance of the flow of the exhaust gas. The distance between the deflection body and the open end of the exhaust gas tube 2 has to be sufficient to avoid constriction of the exhaust gas flow entering the present scrubber from the exhaust gas tube 2.

The angle identified in FIG. 1 as a, of the lower cone of the deflection body, is about 80 to 100°, normally about 90°. The gas flow of the exhaust gas depends i.a. on the configuration of the deflection body 4. A more acute angle α of the deflection body 4 may cause less turbulence in the gas flow and thus a lower degree of mixing of the mist and the incoming exhaust gas, whereas a less acute angle may cause an unwanted high pressure drop over the scrubber. An angle α between 80 and 100° has been found to be an optimal compromise between reducing the pressure drop caused by the cone, and the efficient spreading of the airflow uniformly in the scrubber.

The diameter of the deflection body 4, which is coaxially arranged above the exhaust tube 2 inlet to the scrubber 1, has to be larger than the diameter of the exhaust tube 2 to prevent precipitation of scrubbing fluid to fall into the exhaust tube 2. At the same time, the diameter of the deflection body must be small enough to avoid too high constriction of the exhaust flow between the constriction body and the scrubber walls as this may result in a too high increase the pressure drop over the scrubber. The skilled person will also understand that an outer rim 4' of the deflection body 4 will normally include an edge from which water will drop to avoid that water at the top part of the deflection body follows the lower surface of the deflection body and drips into the exhaust gas tube 2. Water entering the exhaust gas tube may be detrimental to the ships engine connected to the exhaust gas tube.

Optional mist nozzles 9 arranged on water tubes 10 may be provided arranged in the volume below the maximum width of the deflection body. Not illustrated water spray nozzles may also be provided inside the exhaust gas tube 2, in addition to or instead of the optional mist nozzles 9. The role of the optional mist nozzles 9 and the not illustrated spray nozzles in the exhaust gas tube 2 is to introduce water droplets into the exhaust gas for cooling and humidifying of the exhaust gas by evaporation of the water in the spray from the nozzles.

A ring shaped wall deflector 5 is preferably arranged in the wall downstream of the deflection body 4, i.e. higher up in the scrubber than the maximum width of the deflection body 4. The role of the wall deflector is to guide the upcoming exhaust gas out from the wall and towards the length axis of the scrubber. The wall deflector and the deflection body cooperates in giving a substantially uniform gas distribution and flow of gas in the scrubber above the wall deflector 5, and to lead the gas stream towards water injectors 6, 6' downstream of the deflection body, i.e. higher than the deflection body in the scrubber.

The water injectors 6, 6' are arranged for introduction of water for scrubbing of the exhaust gas, i.e. for absorbing primarily SOx and for reduction of particles in the exhaust gas. Water injector(s) 6 is (are) arranged to inject water mainly upwards, whereas the water injector(s) 6') is (are) arranged to inject water mainly in a downwards direction. The skilled person will also understand that to function as a scrubbing liquid, water introduced through the water injectors 6,6', the injected water drops/droplets has be well distributed in the lower scrubbing chamber 3. Some of the scrubbing water injected via the water injectors 6, 6' may evaporate but most of the water will fall towards the bottom of the lower scrubbing chamber and be withdrawn therefrom through lower scrubbing chamber water outlet(s) 8. The skilled person will understand that a substantial part of the the liquid drops/droplets injected upwards will retard and start falling downwards due to the gravitation. The falling droplets and drops will flow countercurrent to the exhaust gas to scrub the gas. A part of the falling drops will hit the top of the deflector and will be led towards the outer wall of the scrubber. The water injectors 6, 6' are preferably arranged substantially along the length axis of the scrubber, between the deflection body and a constriction defined by a lower chamber exhaust gas outlet 12.

Due to the turbulent flow of the gas, and the design of the upper part of the deflection body and the wall deflectors 5, both an optimal distribution of the gas and an optimal contact between the gas and water droplets introduced by the water injectors 6, 6', are obtained.

The wall deflector 5 preferably has a wedge shaped cross section having an acute angle β pointing downwards in the scrubber 1, i.e. directed towards the bottom part of the scrubber. It has been found that the angle β preferably should be from about 5° to about 30°. According to calculations, the most preferred angle β is about 20°, to obtain the above mentioned optimal water/gas contact and at the same time a uniform gas distribution and gas flow in the scrubber 1.

The shape of the upper part of the deflection body 4, i.e. the cone pointing upwards, is also of importance for optimization of the scrubber design. The upper part of the deflection body affects the flow pattern of the gas above the deflection body and will cooperate with the wall deflector 5. The angle defined by the top of the upper cone, $\alpha'$, is adjusted so that the top cone of the deflector 4 interacts with the wall deflector 5, and so that the falling water falling at the top of the deflector 4 are led towards the outer wall of the scrubber in a direction that minimizes backsplash that may hit into the exhaust tube 2. To obtain this the angle $\alpha'$ will normally be $\leq 90°$, such 90 to 70°, or about 93°.

The exhaust gas in the exhaust tube 2 has typically a temperature from about 220 to about 385° C., depending on the load of the engine producing the exhaust gas and if an economizer, normally arranged to utilize the heat in the exhaust gas for generation of steam, is engaged. The incoming exhaust gas is cooled by introduction of water droplets or mist into the exhaust gas and that cools the exhaust gas by evaporation, as will be further disclosed below. The incoming exhaust gas is relatively dry and is efficiently cooled by evaporation of the water mist and water droplets that is mixed with the incoming exhaust gas as described above. To achieve an efficient absorption of SOx from the exhaust gas into scrubbing water, a temperature of about 40° C., or lower, is required in the scrubbing chamber.

The water introduced by the water injectors may cool the incoming exhaust sufficiently. The water introduced in water injectors 6,6', falls downwards in the lower scrubber chamber 3 as described above, and as will be described in further detail below.

Additional water, in the form of water mist, may be introduced through the optional mist nozzles 9, receiving water from mist lines 10, the mist nozzles 9 being arranged inside of the wall of the scrubber 1 in the area where the exhaust gas is led out towards the scrubber walls by the deflection body 4. The turbulence in the redirected exhaust gas flow in this area between the scrubber walls and the deflection body, ascertains an intimate mixing of water droplets, water mist and exhaust gas.

The skilled person will also understand that water mist for cooling of the incoming exhaust gas may be arranged at other positions. Accordingly, the nozzles 9 may be arranged in the area between the exhaust gas tube 2 and the lower part of the deflection body as illustrated in FIG. 1, or be arranged at or close the scrubber walls. Alternatively, or additional to the nozzles 9, not shown nozzles may be arranged inside the exhaust gas tube 2. Water flow and the size of the formed droplets nozzles arranged inside the exhaust gas tube has to be controlled to avoid formation of drops that may fall back and end up in the ship's engine.

To obtain an intimate mixing of exhaust gas and water droplets and water the optional mist nozzles 9 spray at an obtuse angle, typically between 100 and 150°, such as about 130°. The mean droplet size of the spray from the optional spray nozzles 9 is from about 0.1 mm to about 0.5 mm, such as about 0.25 mm to allow rapid evaporation to cool the exhaust gas. The same spray angles and droplets sizes applies to any not shown nozzles in the exhaust gas tube 2. To obtain a uniform distribution of the water droplets in the exhaust gas, the skilled person will understand that a plurality of mist nozzles are preferred.

The use of mist nozzles arranged below the widest part of the deflection body, i.e. below the most narrow exhaust gas passage between the deflection body and the walls of the scrubber, the mist is being intimately mixed with the exhaust gas due to turbulent exhaust gas flow created below the widest part of the deflection body and the further flow path as it opens upwards.

Water drops raining from the water injectors 6, 6' will fall into the open space between the deflection body and the walls of the scrubber, or hit the upwardly pointing cone of the deflection body 4. The upwards pointing cone of the deflection body 4, or the top of the deflection body 4, also has the function as an "umbrella" for avoiding water to rain into the exhaust tube 2. Water falling downwards onto the top of the deflection body 4 will bounce outwards towards the walls of the scrubber. The resulting water flow comprising water drops and droplets of different sizes will flow mainly downwards and countercurrent to the exhaust gas in the space between deflection body and the walls of the scrubber.

The water injectors 6, 6' are arranged on injector tubes 7 that are connected to water supply tubes outside of the scrubber 1. The scrubber illustrated in FIG. 1 has two water injectors 6, 6' arranged on each injector tubes 7 arranged at different height levels in the scrubber 1. The number of water injectors 6, 6' in the lower scrubbing chamber may vary dependent on the actual design and design criteria for the scrubber in question.

FIG. 1 illustrates an embodiment wherein two water injectors 6, 6', one arranged to spray mainly upwards, and the other one arranged to spray mainly downwards, are arranged at each injector tube 7. According to the illustrated embodiment, two injector tubes 7 each provided with two injectors 6, 6', is provided in the lower scrubbing chamber 3. The skilled person will undertand have nozzles spraying both upwards and downward, one pointing upwards, 6', and one or more pointing downwards, 6. Optionally, one water injector 6 at the upper injector tubes 7 is directed upwards, whereas one water injector 6' at the lower injector tube 7 is pointing downwards. The water spray from the upwards directed water injector 6 assists in driving the exhaust gas from the lower scrubbing chamber 3, through the constriction defined by the lower chamber exhaust gas outlet 12 and into the upper scrubbing chamber by creating a venture effect in the constriction.

The downwards pointing water injector(s) 6' is (are) directed downwards against the main direction of the exhaust gas flowing upwards in the scrubber 1. The water injectors 6,6' comprises one or more nozzle(s) designed to provide a widely spread flow of drops having an average size that large enough to allow the water drops to fall down into the bottom part of the scrubber against the flow of the exhaust gas, and at the same small enough to provide sufficient contact area for absorption of SOx, and for capturing particles present in the exhaust gas.

Typically the spray cone angle from the water injectors 6, 6' is from 90 to 150°, such as about 120°, to obtain a sufficient distribution of water droplets in the scrubber. The droplet size may vary dependent on the typical mean velocity of the exhaust gas inside the volume of the scrubber. Typically, the mean gas velocity is from about 6 to 12 m/s, such as about 8-10 m/s. The mean droplet size (diameter) to allow the water to fall downwards in the scrubber against the exhaust gas flowing upwards, and at the same time obtain a sufficient contact area, is from about 2 mm to about 3.5 mm, such as from about 2.5 to about 3 mm.

The water injectors 6, 6' may be of any kind that are capable of producing water droplets of the indicated mean diameter. Each water injector 6, 6' may comprise one or more spray orifices all directed at an angle towards the exhaust gas inlet and at different angles to cover a spray cone angle as indicated above.

The water introduced through the optional spray nozzles 9 and the water injectors 6, 6' is preferably sea water. The water spray from the optional spray nozzles 9 cools and saturates the exhaust gas with water, whereas the water spray from the water injectors 6, 6' functions both as as a scrubbing solution for the exhaust gas, for removal/reduction of SOx, and dust, such as soot and other particulate matter present in the exhaust gas, in addition to cooling the exhaust gas. The water droplets sprayed out from the water injectors 6, 6' dissolves SOx based on the solubility in the water. Additionally, SOx may react with solutes in the water to increase the capturing capacity of the water. Particles in the exhaust gas are captured by the water. The droplets falling downwards in the scrubber are collected at the bottom of the lower scrubbing chamber, and the collected water is withdrawn trough one or more lower chamber water outlet(s) 8, and further treated as will be described in more detail below.

The scrubbed gas in the lower scrubbing chamber 3 is withdrawn through the lower chamber exhaust gas outlet 12 as mentioned above. The lower chamber exhaust gas outlet 12 is, as mentioned above, a coaxially arranged constriction formed substantially an axial narrowing of the lower scrubbing chamber 3. The design of the axial narrowing of the lower scrubbing chamber is, however, important to reduce the pressure drop over the scrubber. Preferably the narrowing is designed substantially as a bottleneck designed to reduce pressure drop over the narrowing by avoiding sharp edges that may disturb the exhaust gas flow and increase flow resistant therein.

The above mentioned upwards directed water injector(s) 6 below the lower chamber exhaust gas outlet 12 restriction, causes a venturi effect in the lower chamber exhaust gas outlet 12 that will both reduce the pressure drop and cause intimate contact between the exhaust gas and the water injected from the upwards directed water injector 6.

The gas withdrawn through the lower chamber exhaust gas outlet 12 is introduced into an upper scrubbing chamber 13, being configured mainly the same way as the lower scrubbing chamber 3.

The incoming exhaust gas is redirected by means of an upper chamber deflection body 14, an upper chamber wall deflector 18, and water mist is sprayed into the scrubbing chamber 13 through water injectors 16 arranged on injector tubes 17. All water injectors in the upper scrubbing chamber 13 are directed downwards. Water is collected at the bottom of upper scrubbing chamber 13, and is withdrawn through one or more upper chamber water outlet(s) 18.

Scrubbed gas is leaving the upper scrubbing chamber 13 through a scrubber outlet 20 from which the scrubbed exhaust gas it released into the atmosphere directly or via a not shown cleaned exhaust gas outlet pipe. The scrubber outlet 20 may be formed substantially an axial narrowing of the upper scrubbing chamber 13 corresponding to the lower chamber exhaust gas outlet 12, as the same considerations regarding reduction of pressure drop etc. has to be taken.

A demistor 19 is arranged at the top of the upper scrubbing chamber 13, or in the transition between the scrubbing chamber and the scrubber outlet 20, to remove or substantially reduce the amount of water droplets that are released from the scrubber together with the scrubbed exhaust gas. The demister 19 comprises a pad of wires, either knitted, woven or non-woven, supported by a framework, to capture droplets entrained with the gas to avoid or substantially reduce the amount of droplets in the gas released into the atmosphere. The wires of the pad may be of any suitable material as long as the material is durable and is not eroded by the conditions in the stripper. Stainless steel is presently the most preferred material for the wires. Preferably, a water distributor 21 receiving water from a demister water supply line 22 are provided for distributing water over the demister to remove accumulated solids in the demister mesh and to improve the mist capturing by the demister. The solids may be a result of solids contained in water droplets and/or salts precipitating from captured droplets. Captured droplets and washing water forms larger drops that falls downwards into the upper scrubbing chamber 13 and is removed together with the scrubbing liquid in line 18.

Figure 2:
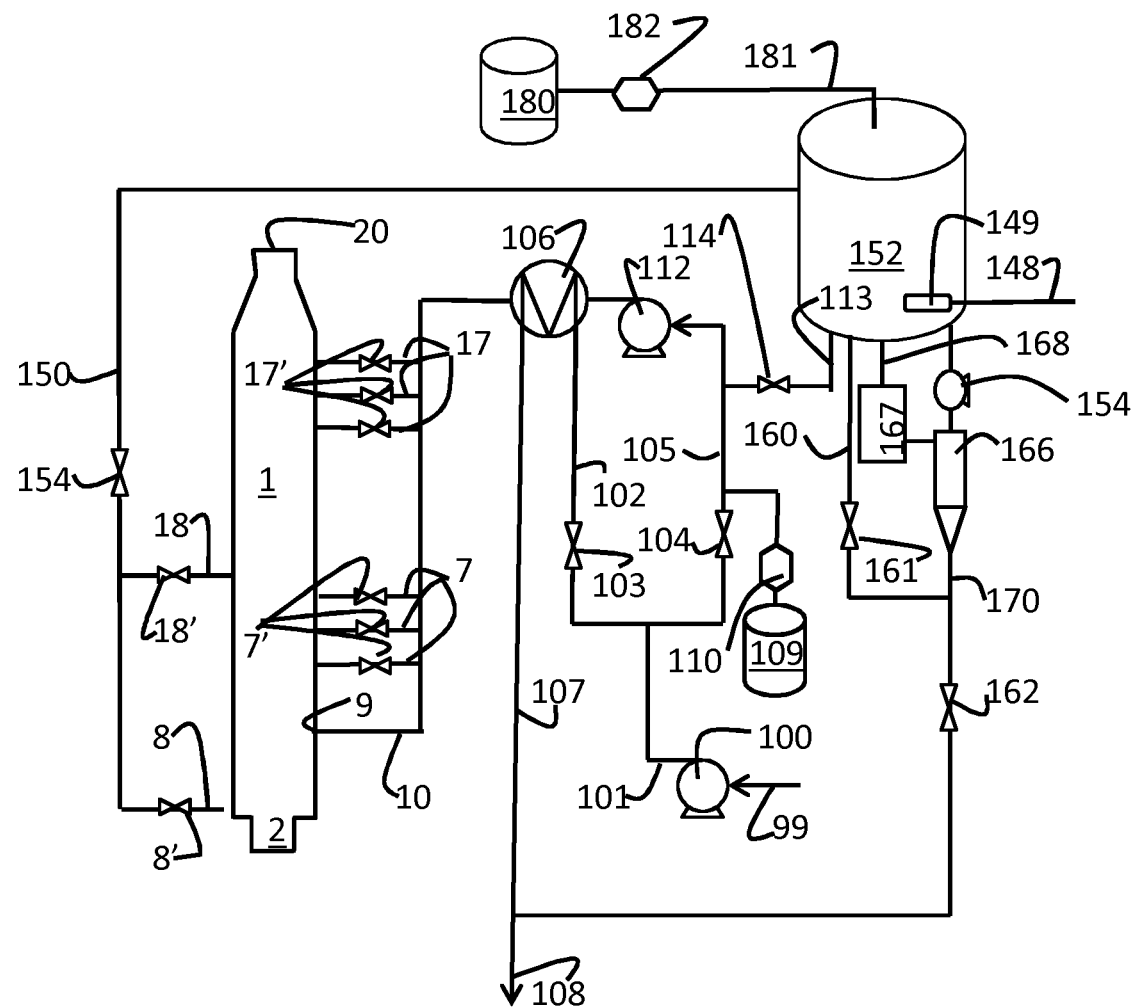
FIG. 2 is a principle sketch of a basic embodiment of a plant for exhaust gas treatment.

FIG. 2 is a simplified principle sketch of an exhaust cleaning system including the above described scrubber 1. Sea water is taken in from the sea chest through a not shown sea water intake common for several sea water consumers onboard. The sea water from the common sea water intake is treated for reduction of solids etc. and to prevent or reduce fouling in lines and tanks. The thus already treated sea water is introduced into the present plant through a sea water intake pipe 99 through a sea water intake pump 100 providing a required pressure. The water excites the pump 100 through a pressurized sea pipe 101, which is split into a cooling water pipe 102 and a process water line 103, each controlled by valves 104, 105, respectively.

The cooling water in the cooling water pipe 102 is introduced into a cooler 106 for cooling of process water to be used for spraying in the scrubber 1 in the closed mode of operation as will be described below. The cooling water leaving the cooler 106 is led through a cooling water exit line 107 and released into the sea surrounding the vessel through a common overboard water outlet line 108.

The present exhaust gas cleaning system may be operated in an open or a closed mode. The open mode will be described first, below.

The water in process water line 103 is, as mentioned above, controlled by a process water valve 104. In the open mode valve 104 is open to allow sea water to enter into line 103. A process water pump 112 is arranged in line 103 to increase the water pressure to the pressure needed for introduction into the scrubber 1. A process tank valve 114 in a process tank pipe 113 connected to a process tank 152 is closed in the open operation mode.

As mentioned above, a cooler 106 is arranged to pipe 103 for cooling the water therein. In the open mode, the cooling water and the water in line 103 are at the same temperature. Accordingly, cooling may be shut down by closing the cooling water valve 103 in the cooling water line 102. Shutting down the cooling in the open mode, reduces the power consumption and thus the cost of running as less water is pumped.

The process water in line 103 is split into the nozzle tubes 7, 17 and spray mist line 10. The water flow in the nozzle tubes into the nozzles is controlled by valves 7', 17'. Water collected at the bottom of each scrubber chamber is withdrawn through water outlet pipes 8, 18. Valves 8', 18' are arranged in the pipes 8, 18 for controlling the flow. The water in lines 8, 18 are introduced into water withdrawal pipe 150 and introduced into process tank 152. A control valve 154 may be arranged in the flow in pipe 150. The skilled person will also understand that a not shown pump may be provided to pump the water in pipe 150 if necessary.

A chemicals additive tank 109 connected to a dosage pump 110 is provided to add chemicals to the water in line 103, to adjust the pH of the water and/or add necessary chemicals, ions etc., to the water. When operating in the closed mode care has to be taken to avoid adding chemicals that are environmentally unacceptable as such or that may form environmentally unacceptable compounds in reaction with components in the seawater and/or exhaust gas. Addition of chemicals such as e.g. $Mg(OH)_2$ to the incoming water may be used to adjust the pH, for increasing the capacity of the water to bind acid gases, such as SON, but will in many waters not be aesthetically acceptable due to the turbidity of the resulting water to be released.

If allowed due to environmental restrictions, water in the process tank 152 may be released via process tank outlet pipe 160 via valves 161, 162 and released through the overboard water outlet line 108.

If stricter environmental regulations apply, valve 161 is closed, and pump 154 is activated to pump water from the tank 152 into hydrocyclone 166 to remove particulate materials from the water. Cleaned water is withdrawn from the hydrocyclone 166 via hydrocyclone clean water lines 170, and is released into the sea through the overboard water outlet line 108. A minor amount of water is withdrawn from the hydrocyclone together with the particulate matter through waste lines 168 and is introduced into a bag filter unit 167. The filters in the bag filter unit are changed according to the need therefore, and the solid waste is taken care of for disposal. The water filtered through the bag filter units are returned into the process tank 152.

When the strictest environmental regulations applies, such as in inshore waters, in harbours, or in environmentally protected areas, such as the Baltic Sea, etc., the present system is operated in a closed mode.

In the closed mode, valve 162 allowing water from the process tank 151 to be released through the overboard water outlet line 108, is closed. Additionally, valve 114 in line 113 connecting process tank 152 to line 103 for the circulating water, is opened so that the process water is taken from the process water tank 152, so that the water is re-circulated.

In the closed mode alkali, such as $Mg(OH)_2$ is added to the process tank 152 to increase the pH, and thus increase the capacity for absorption/binding of SOx. Alkali is added to the tank 152 from an alkali tank 180 via an alkali pipe 181. A dosing pump 182 is provided in line 181 to introduce the required amount of alkali to the tank 152.

Most of the SOx in the exhaust gas is in the form of $SO_2$. Inside the scrubber, the $SO_2$ is dissolved in the water. $Mg(OH)_2$ added to the scrubbing water will then react with $SO_2$ according to the following equations:

$$Mg(OH)_2 + SO_2 \rightarrow MgSO_3 + H_2O$$

$$MgSO_3 + SO_2 + H_2O \rightarrow Mg(HSO_3)_2$$

$$Mg(HSO_3)_2 + Mg(OH)_2 \rightarrow 2MgSO_3 + 2H_2O.$$

$Mg(OH)_2$ may be loaded as such onboard the vessel and introduced into the process. Alternatively, MgO may be provided. MgO may be reacted with water to produce $Mg(OH)_2$ in a process facility onboard to increase the reactivity thereof.

Oxygen is added to the water in process tanks 152 by aeration, i.e. introduction of a gas being oxygen, air or oxygen enriched air via an air line 148 connected to an air diffuser 149, and allowing the introduced gas to bubble through the water. Introduction of oxygen into the tanks allows further oxidation of the $MgSO_3$ according to the formula:

$$MgSO_3 + \tfrac{1}{2}O_2 \rightarrow MgSO_4.$$

Cooling of the circulating water is especially important for operation of the system in the closed mode. Cooling of the circulating water is obtained by means of the cooler 106, as described above. Used cooling water introduced from the water intake 100, is not polluted by any internal processes onboard the vessel and may be released through overboard water outlet 108.

During the closed mode, the valve 105 in line 103 controlling the incoming seawater is controlled only to add the water loss in the process caused by evaporation in the scrubber.

The system described with reference to FIG. 2 has a limited time of operation in the closed mode as solutes etc. accumulates in the circulating water and the presently described purification system is not developed for continuous operation over a prolonged period. The system described with reference to FIG. 2 may e.g. be designed to be operated for about 72 hours, corresponding to the time taken for a cruise vessel to enter the protected area in the Baltics to the harbours of interest. In harbour, the circulating scrubbing water may be disposed at plants for liquid waste and replaced by new water.

The skilled person will understand that redundancy may be introduced for critical parts of the water treatment system described with reference to FIG. 2. Such critical parts may e.g. be hydrocyclone 166 and bag filter units 167.

The present system have important advantages over prior solutions, as the scrubber will have a function as a silencer as well as cleaning the exhaust gas for particulate matter as well as SOx. Additionally, in case of failure with the water circulation, the present scrubber may be operated as a silencer even without water, whereas known alternative solutions cannot be operated dry and requires the presence of a bypass exhaust line in case water circulation stops. The present system is also less space consuming than the prior known solutions and requires no or few modifications onboard an existing ship. Under most circumstances, an existing ship may be under full operation during the installation the present system.

The skilled person will understand that even if the scrubber described above comprises two serially connected scrubber chambers, the scrubber may comprise more than two serially connected scrubber chambers.

In most ship designs, such as cruise vessels, the present scrubbers may in most instances be installed during operation of the vessel. The exhaust gas is led from the engines to the exhaust pipe in exhaust tubes where one silencer per exhaust tube is arranged to dampen the noise from the engine, before the exhaust gas is released into the surroundings. The presently described and claimed scrubbers substitute the silencer, as the scrubber has substantially the same diameter as the silencer it substitutes, and is, as mentioned above, typically about 30% longer than the silencer. Normally, substitution of the silencer by the present scrubber does not require any major rebuilding onboard the vessel, as there is sufficient space inside the chimney to allow this increase in length compared to the silencer.

During the substitution of the silencer with a scrubber according to the present invention, the exhaust gas to the relevant exhaust tube is shut off by stopping one of the ship's engines, without effecting the operation of the vessel. As soon as the present scrubber has replaced the silencer and is securely fastened inside of the chimney and to the exhaust tube, the engine may be re-started, and be operated as normal as the present scrubber will function as a silencer and not be damaged, even if run dry. The installation of the scrubber may then be continued without effecting the operation of the vessel. As soon as the water injection and water treatment system is installed onboard, the scrubbing may be started.

The remaining system for water treatment and injection into the scrubber may be installed independently from the scrubber as such. The process tank 152, hydrocyclone, 166, pumps, pipes, heat exchanger 106, etc, are also space consuming but may be arranged within or close to the engine room and will require minimum onboard rebuilding resulting in reduced area available for passengers, as such reductions results in reduced income for the vessel.

A specific advantage for the present scrubbers is that the scrubbers may be run dry, i.e. without introduction of water through the spray nozzles or the water injectors. The water pressure may drop or disappear due to technical failures. During dry operation, the present scrubbers function as silencers without any damaging results to the scrubbers even if the scrubbers are operated dry for a prolonged time period. Even though dry operation may result in an increased noise level compared to normal operation of the scrubbers, due to the silencing effect of the water, the noise is not worse than in a situation where noise was reduced by the original silencers. As soon as the water is back, the scrubbers will again function as above described.

Packed scrubbers, on the other hand, cannot be operated without sufficient amount of water for an extended period as the packed bed is being clogged by the particles present in the exhaust gas if operated without water. To avoid having to stop engines if the pressure of the stripping water disappears, the exhaust gas stream has to be redirected to the original silencers if the water supply to the packed scrubbers is stopped for more than a predetermined period as mentioned above. This means that the original exhaust tubes and the silencers have to be kept inside of the chimney, and that space-consuming scrubbers has to displace areas onboard that is normally used as areas for passengers.

Example

Calculations have been made for handling of exhaust gas from a 12.6 MW ships engine, having an exhaust gas flow rate at 100% load of about 71,000 m³/h. The exhaust gas flow from the engine may vary from about 14,000 m³/h to about 71,000 m³/h. The calculations are made at the normal load of about 75% of maximum load, resulting in a gas flow of about 53,200 m³/h, corresponding to an incoming gas velocity in an exhaust gas pipe having a diameter of about 1.2 m of 38 m/s. As mentioned above, the exhaust gas in the exhaust tube 2 has typically a temperature from about 220 to about 375° C., depending on the load of the engine producing the exhaust gas and if an economizer, normally arranged to utilize the heat in the exhaust gas for generation of steam, is engaged.

The scrubber 1 used for the calculations has a diameter of about 2.3 meters, and a total height of about 15.5 meters. Starting from a normal load and a exhaust gas temperature of 240° C. and an exhaust gas mass flow of 22.4 kg/s, about 3 kg/s water is introduced through the mist nozzles 9 for cooling of the exhaust gas to about 40° C., a temperature that close to the temperature of the introduced cooling water, confirming that all cooling is a result of evaporation. The spray nozzles produced mist having mean droplet size of 0.25 mm. The use of mist nozzles 9 are as mentioned above optional, and my be omitted at the lower exhaust gas inlet temperatures, i.e. if an economizer is operated upstream of the present scrubber.

About 36 kg water/second was introduced through each of two water injectors 6, 6' per scrubbing chamber, or a total of about 144 kg water/second, in the calculated model to obtain sufficient removal of particles and SOx. The mean droplet size of the droplets introduced through the water injectors 6, 6', 16 is between 0.5 and 3 mm, such as about 2.5 to 2.8, or about 2.7 mm, to obtain a sufficiently large surface area to obtain the required capture of particles and SOx, and to allow the droplets to fall downwards against the flow of the exhaust gas.

The simulations indicate that the uniformity in gas velocity distribution in the scrubber chambers was very good, immediately above the first, or lower deflection body 4, which is promising for the efficiency of the scrubber. The simulation also confirmed that the temperature was uniform directly above the first deflection body 4. The demand for water for efficient scrubbing is less than for known scrubbing systems for exhaust gas. Pumping of water to be introduced into the scrubber is power consuming. Reduction of water volume per second is important to reduce the power requirement, and thus the running costs for the scrubber solution.

The pressure drop over the scrubber, increased from about 0.9 kPA when the scrubber was operated without water, i.e. as a silencer only, to 1.47 kPA during operation as a scrubber. This pressure drop, caused by the droplets, is smaller than for earlier suggested packed bed scrubbers that are more space consuming in addition to the other mentioned disadvantages mentioned above.

The findings of the simulations have been confirmed by a prototype installation in a vessel in operation. The prototype was installed and operated without disturbing the operation of the vessel. The prototype removed >85% of the particles in the exhaust gas as measured by laser measurements. Additionally, about 99% of the SOx was removed from the exhaust gas when the scrubber was operated in the open mode.

The invention claimed is:

1. A scrubber for exhaust gas from a marine vessel, comprising:
    a lower and an upper scrubbing chamber, the lower and upper scrubbing chambers being substantially symmetric about a common length axis being substantially vertically arranged;
    a lower chamber exhaust gas outlet arranged at a top of the lower scrubbing chamber as a coaxial constriction for withdrawing partly scrubbed exhaust gas from the lower scrubbing chamber and introducing the exhaust gas into the upper scrubbing chamber, the lower chamber exhaust gas outlet being a bottleneck to reduce a pressure drop over the scrubber;
    an exhaust gas tube substantially coaxially arranged through a bottom part of the lower scrubbing chamber, the exhaust gas tube opening into the lower scrubbing chamber;
    an exhaust gas outlet coaxially arranged through the top of the upper scrubbing chamber;
    a lower scrubbing chamber deflection body comprising two oppositely directed straight cones having a common base and a common axis of rotation coinciding with a length axis of the scrubber, the lower scrubbing chamber deflection body arranged above an opening of the exhaust gas tube for redirecting the exhaust gas towards walls of the scrubber to create turbulent gas flow; and
    at least one lower chamber water injector arranged substantially along a length axis of the lower scrubbing chamber and above the lower scrubbing chamber deflection body to introduce scrubbing water into an exhaust gas stream, the at least one lower chamber water injector directed upward toward the lower chamber exhaust gas outlet to create a Venturi effect in the lower chamber exhaust gas outlet.

2. The scrubber according to claim 1, wherein at least one lower chamber water outlet is arranged to withdraw scrubbing water collected at the bottom part of the lower scrubbing chamber.

3. The scrubber according to claim 1, wherein two or more water injectors are arranged in the lower scrubbing chamber and where at least one of the water injectors is directed downwards, towards the lower scrubbing chamber deflection body.

4. The scrubber according to claim 1, wherein a ring shaped lower chamber wall deflector is arranged in a wall of the scrubber.

5. The scrubber according to claim 1, wherein the top angle ($\alpha$) of a downwards directed cone is 80-100°, and top angle of an upwards directed cone is 70 90°.

6. The scrubber according to claim 1, wherein at least one water mist nozzle is arranged in the lower scrubbing chamber below the lower scrubbing chamber deflection body.

7. The scrubber according to claim 1, wherein an upper scrubbing chamber deflection body is arranged inside the upper scrubbing chamber and above the lower scrubbing chamber exhaust gas outlet.

8. The scrubber according to claim 5, wherein at least one upper scrubbing chamber water injector is arranged in the upper scrubbing chamber.

9. The scrubber according to claim 1, wherein a demister is arranged at the top of the upper scrubbing chamber for reduction of water mist in the scrubbed exhaust gas.

* * * * *